Patented Nov. 6, 1945

2,388,597

UNITED STATES PATENT OFFICE 2,388,597

BICHALCOGENOUS MATERIALS

William James Burke, Marshallton, Del., assignor to E. I. du Pont de Nemours & Company, Wilmington, Del., a corporation of Delaware No Drawing. Application May 11, 1944,
Serial No. 535,195

24 Claims. (Cl. 260—231)

This invention relates to new polymeric materials containing both sulfur and oxygen and more particularly to linear polymers having extralinear, thioether sulfur-containing substituents attached to the polymer chain through oxygen.

This invention has as an object the provision of new polymers. A further object is the provision of films, plastics and coating compositions. Other objects will appear hereinafter.

These objects are accomplished by the following invention wherein a linear high polymer, i. e., a linear high molecular weight or macromolecular polymer, having ethylenically unsaturated substituents attached to the polymer chain through oxygen is reacted with a mercaptoacetoxy compound, i. e., mercaptoacetic acid or an ester thereof. The invention includes within its scope the products of the reaction, which are characterized by having a linear high polymer chain with substituents attached thereto through oxygen, said substituents having an oxycarbonylmethylthio group attached through the thioether sulfur. The term "oxycarbonylmethylthio group" is used herein to define the carboxymethylthio and esterified carboxymethylthio groups. A particularly preferred subgenus of the invention is that of carboxymethylthioalkoxy substituted linear high polymers and esters thereof.

The linear high molecular weight unsaturated polymer is preferably reacted with the mercaptoacetoxy compound at 20 to 150° C. for one to sixty hours in the presence of a suitable solvent. In general at least one mol of the mercaptoacetoxy compound is used per ethylenic double bond. Oxygen and peroxy compounds are effective catalysts for the reaction.

The more detailed practice of the invention is illustrated by the following examples, wherein parts given are by weight. There are, of course, many forms of the invention other than these specific embodiments.

Example I

Crotylethylcellulose containing 1.0 crotyl and 1.3 ethyl groups per glucose unit is prepared by reacting alkali cellulose (1 mol) with crotyl chloride (3 mols) and ethyl chloride (9 mols) in a nickel-lined autoclave at 120° C. for ten hours in the presence of benzene. The product has an iodine number of 99 and analyzes for 59.9% carbon and 8.9% hydrogen.

To 100 parts of the crotylethylcellulose dissolved in 600 parts of benzene-methanol (90–10) is added 50 parts of ethyl mercaptoacetate and 1 part of ascaridole as catalyst. After 48 hours at room temperature the clear reaction mixture is cast into film which is washed thoroughly with several portions of petroleum ether in order to remove unreacted ethyl mercaptoacetate. The purified product contains 8.2% sulfur. This indicates the presence of 0.95 carbethoxymethylthiobutoxy groups per glucose unit and corresponds to the addition of ethyl mercaptoacetate to 95% of the double bonds in the original crotylethylcellulose. The reaction which is believed to occur is indicated below.

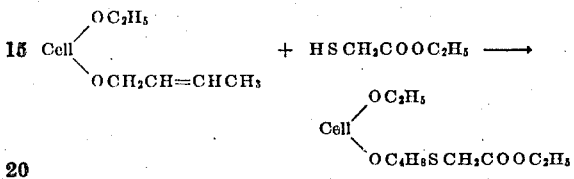

Physical properties of clear bright film of the product cast from benzene-methanol (90–10) solution along with those of the original crotylethylcellulose are given in Table I.

Table I

| Film | Tensile strength, p. s. i. | Percent elongation | Schopper folds [1] |
|---|---|---|---|
| Crotylethylcellulose | 5,200 | 22 | 95 |
| Reaction product | 5,800 | 31 | 156 |

[1] On 3 mil films.

Similar results are obtained when a methallylethylcellulose containing 1.0 methallyl and 1.4 ethyl groups per glucose unit is used in place of this crotylethylcellulose.

Example II

Crotylcellulose containing 2.8 crotyl groups per glucose unit is prepared by reacting alkali cellulose (1 mol) with crotyl chloride (12 mols) in the presence of benzene in a nickel-lined autoclave at 125° C. for ten hours. The product has an iodine number of 221 and analyzes for 66.0% carbon and 9.2% hydrogen.

To five parts of the above crotylcellulose dissolved in 15 parts of benzene-methanol (85–15) is added six parts of mercaptoacetic acid. After 48 hours at room temperature, the thick mass which separates out of the reaction mixture is washed with benzene and then dissolved in methanol. Clear bright film cast from the resulting solution is washed thoroughly with water to remove unreacted mercaptoacetic acid. The product analyzes for 14.0% sulfur. This corresponds to 2.4 carboxymethylthiobutoxy groups per glucose unit. The product is soluble in lower aliphatic alcohols, dioxane and 2% aqueous sodium hydroxide and is insoluble in aliphatic and aromatic hydrocarbons and water. The probable reaction is given below.

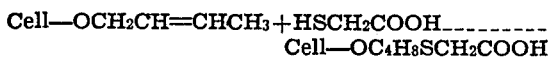

Cell—OCH₂CH=CHCH₃ + HSCH₂COOH →
Cell—OC₄H₈SCH₂COOH

In carrying out the process of this invention there can be employed any linear high polymer, i. e., any linear high molecular weight or macromolecular polymer, containing ethylenically unsaturated substituents attached to the main polymer chain through oxygen. The ethylenic unsaturation can be present in substituents, such as ether, ester, acetal, ketal and carbamate, attached to the main polymer chain through oxygen. Linear high molecular weight polymeric materials which are suitable as starting materials for the preparation of the unsaturated polymers include cellulose, starch, polyvinyl alcohol, partially or completely hydrolyzed vinyl acetate interpolymers, N-methylolpolyamides, etc. Specific examples of suitable unsaturated polymers include partially or completely substituted methallylethylcellulose, cellulose acetate crotonate, cellulose butyrate methacrylate, crotylmethylstarch, crotyl ethers of polyvinyl alcohol, mixed acetals of polyvinyl alcohol with butylaldehyde and acrolein, ethylcellulose allylcarbamate, N-(allyloxymethyl) polyhexamethyleneadipamide, methallyl ethers of hydrolyzed ethylene/vinyl acetate interpolymers, and the ketal from polyvinyl alcohol and methyl vinyl ketone. Organic solvent-soluble unsaturated polymers may be reacted with the mercaptoacetoxy compounds with particular ease since the reaction can be carried out in a homogeneous system by employing a mutual solvent for the unsaturated polymer and mercaptoacetoxy compound. Among the products of this invention, those prepared from polymeric unsaturated ethers are outstanding in their resistance to both acids and bases. Particularly preferred are O-(carboxymethylthio-n-butyl) cellulose and O-(carboxymethylthioisobutyl) celluloses, prepared by reacting mercaptoacetic acid with crotylcelluloses and methallyl celluloses respectively, and the esters of these acids derived from alkanols having less than eight carbon atoms.

Compounds which contain a mercaptoacetoxy group and are suitable for use in this invention include mercaptoacetic acid, methyl mercaptoacetate, beta-methoxyethyl mercaptoacetate, butyl mercaptoacetate, hydroxyethyl mercaptoacetate, phenyl mercaptoacetate, benzyl mercaptoacetate, lauryl mercaptoacetate, glycol dimercaptoacetate and glycerol trimercaptoacetate. The monoesters are preferred for most purposes, but polymercaptoacetates such as those listed above are suitable for use where insoluble, crosslinked products are desired. Mercaptoacetic acid and its esters prepared from lower alkanols, i. e., those having less than eight carbon atoms are preferred since they react with ease and are readily available. In general it is preferable to use at least one mol of the mercaptoacetoxy compound per double bond of the polymer, and an excess of the former favors a shorter reaction time. By control of time, temperature, and ratio of reactants, it is possible to add the mercaptoacetoxy compound to all or any desired portion of the double bonds in the polymer.

Although the reaction is generally carried out in the presence of a mutual solvent for the unsaturated polymer and the mercaptoacetoxy compound, an intimate mixture of the reactants in the absence of a solvent can be used. In certain cases it is desirable to employ the mercaptoacetoxy compound as both reactant and solvent. Suitable inert solvents include dioxane, chloroform, 1,2-dimethoxyethane and alcohol-aromatic hydrocarbon mixtures such as benzene-methanol or toluene-ethanol. The particular solvent chosen will, of course, depend largely on the unsaturated polymer used.

Addition of a catalyst is not essential, but ultraviolet light, and particularly substances containing directly linked oxygen, particularly oxygen and peroxy compounds such as diethyl peroxide, ascaridole, and benzoyl peroxide promote addition of the mercaptoacetoxy compound to the unsaturated polymer.

Reaction temperatures in the range 15–150° C. or even higher are suitable for use in this invention. In the presence of a catalyst reaction proceeds readily at room temperature, but use of higher temperatures favors a shorter reaction time. In general, a reaction time of one to sixty hours is suitable. Either atmospheric or superatmospheric pressures can be employed.

The products of this invention are useful in the preparation of fibers, films, plastics and coating compositions.

The above description and examples are intended to be illustrative only. Any modification thereof or variation therefrom which conforms to the spirit of the invention is intended to be included within the scope of the claims.

What is claimed is:

1. A process which comprises reacting a linear high polymer having alkenyl substituents of up to four carbon atoms linked to the polymer chain through oxygen with a member of the class consisting of mercaptoacetic acid and its esters.

2. A process which comprises reacting an organic solvent-soluble linear high polymer having alkenyl substituents of up to four carbon atoms linked to the polymer chain through oxygen with a member of the class consisting of mercaptoacetic acid and its esters.

3. A process which comprises reacting a linear high polymer having alkenyl substituents of up to four carbon atoms linked to the polymer chain through oxygen with mercaptoacetic acid.

4. A process which comprises reacting a linear high polymer having alkenyl substituents of up to four carbon atoms linked to the polymer chain through oxygen with a mercaptoacetic acid ester.

5. A process which comprises reacting a linear high polymer having alkenyl substituents of up to four carbon atoms linked to the polymer chain through oxygen in the presence of a peroxy catalyst with a member of the class consisting of mercaptoacetic acid and its esters.

6. A process which comprises reacting a linear high polymer having alkenyl substituents of up to four carbon atoms linked to the polymer chain through oxygen with a mercaptoacetic acid ester of a lower alkanol.

7. Process which comprises reacting an organic solvent-soluble linear high polymer having alkenyl ether substituents of up to four carbon atoms in the presence of a peroxy catalyst with a member of the class consisting of mercaptoacetic acid and its esters.

8. Process which comprises reacting a cellulose alkenyl ether wherein the alkenyl group is of up to four carbon atoms in the presence of a peroxy catalyst with a member of the class consisting of mercaptoacetic acid and its esters.

9. Process which comprises reacting a crotyl-cellulose in the presence of ascaridole with a member of the class consisting of mercaptoacetic acid and its esters.

10. Process which comprises reacting crotyl-cellulose with mercaptoacetic acid.

11. An O-(carboxymethylthiobutyl) cellulose.

12. An O-(carboxymethylthio-n-butyl) cellulose.

13. An O-(carboxymethylthioisobutyl) cellulose.

14. An O-(carboxymethylthioalkyl) cellulose.

15. An O-(carbethoxymethylthiobutyl) cellulose.

16. An O-(carbethoxymethylthioalkyl) cellulose.

17. An O-(carbalkoxymethylthioalkyl) cellulose.

18. A lower alkyl ester of an O-(carboxymethylthioalkyl) cellulose.

19. A cellulose derivative having a cellulosic nucleus and, attached thereto through oxygen, an alkyl group having up to four carbons and having thereon a substituent of the class consisting of the carboxymethylthio group and the groups wherein said carboxyl group is esterified.

20. A linear high polymer having, attached to the chain of said polymer through oxygen, an alkyl group having up to four carbon atoms and having thereon a substituent of the class consisting of the carboxymethylthio group and the groups wherein said carboxyl group is esterified.

21. A linear high polymer having substituents attached to the polymer chain through ether oxygen said substituents being alkyl groups of up to four carbon atoms which groups are further substituted by a substituent of the class consisting of the carboxymethylthio group and the groups wherein said carboxyl group is esterified.

22. A linear high polymer having, attached through ether oxygen to the polymer chain, alkyl groups of up to four carbon atoms which groups are further substituted by a carbalkoxymethyl-thio group the alkyl group being that of a lower alkanol.

23. A linear high polymer having carboxymethylthio substituted alkyl ether substituents whereof the alkyl group is of up to four carbon atoms.

24. Linear high polymeric compounds having a group of the class consisting of the carboxymethyl group and the esterified carboxymethyl group attached through thio ether sulfur to a bivalent organic radical of up to four carbon atoms the other valence of which radical is attached through ether oxygen to the polymer chain.

WILLIAM JAMES BURKE.